(12) United States Patent
Yajima et al.

(10) Patent No.: US 11,851,197 B2
(45) Date of Patent: Dec. 26, 2023

(54) MOTOR-INTEGRATED FAN, AND VERTICAL TAKEOFF AND LANDING CRAFT

(71) Applicant: MITSUBISHI HEAVY INDUSTRIES, LTD., Tokyo (JP)

(72) Inventors: Toshihide Yajima, Tokyo (JP); Osamu Uruma, Tokyo (JP); Akihiro Takagaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 307 days.

(21) Appl. No.: 17/312,592

(22) PCT Filed: Dec. 10, 2019

(86) PCT No.: PCT/JP2019/048227
§ 371 (c)(1),
(2) Date: Jun. 10, 2021

(87) PCT Pub. No.: WO2020/122056
PCT Pub. Date: Jun. 18, 2020

(65) Prior Publication Data
US 2021/0323688 A1 Oct. 21, 2021

(30) Foreign Application Priority Data
Dec. 13, 2018 (JP) .................................. 2018-233717

(51) Int. Cl.
*B64D 27/24* (2006.01)
*B64D 33/04* (2006.01)
(Continued)

(52) U.S. Cl.
CPC .............. *B64D 27/24* (2013.01); *B64C 29/00* (2013.01); *B64D 33/02* (2013.01); *B64D 33/04* (2013.01);
(Continued)

(58) Field of Classification Search
CPC .. B64D 27/24; B64D 2033/024; B64D 33/02; B64D 33/04; B64D 33/08; H02K 9/227; F04D 25/02; F04D 29/5806
(Continued)

(56) References Cited

U.S. PATENT DOCUMENTS 10,473,107 B1 * 11/2019 Newton ................. B64U 30/20
2008/0219844 A1    9/2008 Decker et al.
(Continued)

FOREIGN PATENT DOCUMENTS

JP          14-4950         4/1939
JP          55-114399       8/1980
(Continued)

OTHER PUBLICATIONS

Written Opinion of the International Searching Authority dated Feb. 25, 2020 in International (PCT) Application No. PCT/JP2019/048227, With English translation.
(Continued)

*Primary Examiner* — Brady W Frazier
(74) *Attorney, Agent, or Firm* — WENDEROTH, LIND & PONACK, L.L.P.

(57) ABSTRACT

A motor-integrated fan sucks air from a suction port and blows out the sucked air from a blow-out port. The motor-integrated fan includes a shaft part that is provided at a center of a rotational axis; a rotation part that is rotated about the shaft part; an outer peripheral part that is provided on an outer periphery of the shaft part; a motor that rotates the rotation part; a heat generating part that generates heat due to an operation of the motor; and a cooling unit that cools the heat generating part with cooling air. The cooling unit includes an air intake port that takes the cooling air in, an air discharge port that discharges the cooling air, and a cooling
(Continued)

flow channel that leads to the air discharge port from the air intake port via the heat generating part.

8 Claims, 12 Drawing Sheets

(51) Int. Cl.
*B64D 33/08* (2006.01)
*F04D 29/58* (2006.01)
*H02K 9/22* (2006.01)
*B64C 29/00* (2006.01)
*B64D 33/02* (2006.01)
*F04D 25/02* (2006.01)

(52) U.S. Cl.
CPC ............ *B64D 33/08* (2013.01); *F04D 25/02* (2013.01); *F04D 29/5806* (2013.01); *H02K 9/227* (2021.01); *B64D 2033/024* (2013.01)

(58) Field of Classification Search
USPC ...................................................... 244/17.11
See application file for complete search history.

(56) References Cited

U.S. PATENT DOCUMENTS

| 2010/0021288 | A1 | 1/2010 | Collette |
| 2016/0152327 | A1* | 6/2016 | Bertels ................. F04D 29/522 |
| | | | 415/121.3 |

FOREIGN PATENT DOCUMENTS

| JP | 2010-23825 | 2/2010 |
| JP | 2013-79606 | 5/2013 |
| JP | 2015-165127 | 9/2015 |
| WO | 2015/005776 | 1/2015 |
| WO | 2017/122406 | 7/2017 |

OTHER PUBLICATIONS

International Search Report dated Feb. 25, 2020 in International (PCT) Application No. PCT/JP2019/048227.

* cited by examiner

MOTOR-INTEGRATED FAN, AND VERTICAL TAKEOFF AND LANDING CRAFT

TECHNICAL FIELD

The present invention relates to a motor-integrated fan and a vertical takeoff and landing craft including a cooling flow channel.

BACKGROUND ART

A cooling system for UAV for cooling equipment, which is disposed in a fan provided in an Unmanned Aerial Vehicle (UAV), using the flow of air generated by the fan is known in the related art (for example, see Japanese Unexamined Patent Application Publication No. 2010-23825). The fan is a ducted fan, and includes a fan shaft, fan blades, and a fan motor. In this cooling system, the flow of air generated by the fan blades is used to remove heat from the equipment.

However, since the flow of air generated by the fan is used in a case where the equipment is cooled in the cooling system disclosed in Japanese Unexamined Patent Application Publication No. 2010-23825, a thrust obtained from the fan is reduced by the amount of flow of air used. Configuration where a blower is provided outside the fan is also considered in order to cool the equipment with air. However, since the blower is provided, an external power supply for operating the blower also needs to be provided. For this reason, configuration around the fan is increased in size.

Accordingly, an object of the present invention is to provide a motor-integrated fan including a cooling flow channel and a vertical takeoff and landing craft that can suitably remove heat from a heat generating part while suppressing the reduction of fan performance.

SUMMARY OF THE INVENTION

A motor-integrated fan according to the present invention is a motor-integrated fan that sucks air from a suction port and blows out the sucked air from a blow-out port. The motor-integrated fan includes a shaft part that is provided at a center of a rotational axis, a rotation part that is rotated about the shaft part, an outer peripheral part that is provided on an outer periphery of the shaft part, a motor that rotates the rotation part, a heat generating part that generates heat due to an operation of the motor, and a cooling unit that cools the heat generating part with cooling air. The cooling unit includes an air intake port that takes the cooling air in, an air discharge port that discharges the cooling air, and a cooling flow channel that leads to the air discharge port from the air intake port via the heat generating part. The air discharge port is provided at a position where pressure of the air discharge port is more negative than pressure of the air intake port.

According to this configuration, cooling air can be taken in from the air intake port using the negative pressure of the air discharge port with respect to the air intake port, and cooling air having passed by the heat generating part can be discharged from the air discharge port. For this reason, heat can be suitably removed from the heat generating part with cooling air. Further, since the negative pressure of the air discharge port with respect to the air intake port is used, the reduction of fan performance can be suppressed. The heat generating part may be a motor or may be an element other than the motor, and is not particularly limited.

Further, it is preferable that the heat generating part and the cooling unit are provided in the outer peripheral part, the air intake port is provided on an outer peripheral surface of the outer peripheral part, and the air discharge port is provided on an inner peripheral surface of the outer peripheral part and is provided on an upstream side of the rotation part in a flow direction of air flowing toward the blow-out port from the suction port.

According to this configuration, in a case where the heat generating part is provided in the outer peripheral part, the cooling unit can take air in from the outer peripheral surface of the outer peripheral part, which is under the atmospheric pressure, and can discharge air from the inner peripheral surface of the outer peripheral part on the upstream side of the rotation part where pressure is reduced. For this reason, since the air intake port and the air discharge port can be provided at positions where a pressure difference between the air intake port and the air discharge port is increased, cooling air can be caused to suitably flow in the cooling flow channel.

Furthermore, it is preferable that the heat generating part and the cooling unit are provided in the outer peripheral part, the air intake port is provided on an inner peripheral surface of the outer peripheral part and is provided on a downstream side of the rotation part in a flow direction of air flowing toward the blow-out port from the suction port, and the air discharge port is provided on the inner peripheral surface of the outer peripheral part and is provided on an upstream side of the rotation part in the flow direction.

According to this configuration, in a case where the heat generating part is provided in the outer peripheral part, the cooling unit can take air in from the inner peripheral surface of the outer peripheral part and can discharge air from the inner peripheral surface of the outer peripheral part. For this reason, since a pressure difference can be generated between the air intake port and the air discharge port even in a case where it is difficult to provide the air intake port and the air discharge port on the outer peripheral surface of the outer peripheral part, cooling air can be caused to suitably flow in the cooling flow channel.

Moreover, it is preferable that the heat generating part and the cooling unit are provided in the outer peripheral part, the air intake port is provided on an outer peripheral surface of the outer peripheral part, and the air discharge port is provided on the outer peripheral surface of the outer peripheral part and is provided closer to the suction port than the air intake port.

According to this configuration, in a case where the heat generating part is provided in the outer peripheral part, the cooling unit can take air in from the outer peripheral surface of the outer peripheral part and can discharge air from the outer peripheral surface of the outer peripheral part. For this reason, since a pressure difference can be generated between the air intake port and the air discharge port even in a case where it is difficult to provide the air intake port and the air discharge port on the inner peripheral surface of the outer peripheral part, cooling air can be caused to suitably flow in the cooling flow channel.

Further, it is preferable that the heat generating part and the cooling unit are provided in the shaft part, the air intake port is provided on an outer peripheral surface of the shaft part and is provided on a downstream side of the rotation part in a flow direction of air flowing toward the blow-out port from the suction port, and the air discharge port is provided on the outer peripheral surface of the shaft part and is provided on an upstream side of the rotation part in the flow direction.

According to this configuration, in a case where the heat generating part is provided in the shaft part, the cooling unit can take air in from the outer peripheral surface of the shaft part and can discharge air from the outer peripheral surface of the shaft part. For this reason, since a pressure difference can be generated between the air intake port and the air discharge port even in a case where the heat generating part is present in the shaft part, cooling air can be caused to suitably flow in the cooling flow channel.

Furthermore, it is preferable that the cooling flow channel is a flow channel formed in a linear shape to the air discharge port from the air intake port.

According to this configuration, since the cooling flow channel is formed in a linear shape, a pressure loss in the cooling flow channel can be suppressed. Accordingly, cooling air can be caused to more suitably flow in the cooling flow channel.

Moreover, it is preferable that an opening area of the air intake port is larger than an opening area of the air discharge port.

According to this configuration, much air can be taken in from the air intake port and the flow speed of cooling air at the air discharge port can be increased.

Further, it is preferable that the air intake port includes a plurality of holes.

According to this configuration, the plurality of holes can be formed to provide the air intake port.

Furthermore, it is preferable that the air intake port includes a slit extending in a longitudinal direction.

According to this configuration, the slit can be formed to provide the air intake port.

Moreover, it is preferable that the air discharge port is provided to protrude from a surface of a portion where the air discharge port is formed.

According to this configuration, since the flow speed of air at the air discharge port can be increased, the negative pressure of the air discharge port can be increased.

Further, it is preferable that the motor-integrated fan further includes an aerodynamic device (i.e., flow acceleration device) for giving a flow to the staying cooling air and the aerodynamic device is provided in at least one of the air intake port, the air discharge port, and the cooling flow channel.

According to this configuration, since cooling air can be caused to suitably flow by the aerodynamic device, cooling efficiency caused by cooling air can be improved.

Furthermore, it is preferable that the motor-integrated fan further includes a thermoelectric conversion element for converting thermal energy generated from the heat generating part into electric energy and supplying electric power to the aerodynamic device, and the thermoelectric conversion element includes a high-temperature part provided on the heat generating part side and a low-temperature part provided on a portion of which a temperature is lower than a temperature of the high-temperature part.

According to this configuration, electric power can be generated by the thermoelectric conversion element using the heat of the heat generating part and can be supplied to the flow acceleration device. For this reason, an external power supply does not need to be provided and the configuration of the motor-integrated fan can be simplified.

A vertical takeoff and landing craft according to the present invention includes the motor-integrated fan and an airframe that is moved by a thrust generated from the motor-integrated fan.

According to this configuration, since the motor-integrated fan in which heat is removed from the heat generating part and the reduction of fan performance is suppressed can be used, a thrust generated by the motor-integrated fan can be appropriately obtained.

DESCRIPTION OF EMBODIMENTS

Embodiments of the present invention will be described in detail below with reference to the drawings. The present invention is not limited by the embodiments. Further, components of the following embodiments include components that can be easily substituted by those skilled in the art or substantially the same components. Furthermore, components described below can be appropriately combined. Moreover, in a case where there are a plurality of embodiments, the respective embodiments can also be combined.

First Embodiment

A motor-integrated fan 1 according to a first embodiment is an axial fan. The motor-integrated fan 1 generates a thrust by taking air in from a suction port and blowing out the air from a blow-out port.

The motor-integrated fan 1 is provided in, for example, a vertical takeoff and landing craft, such as a helicopter or a drone. The motor-integrated fan 1 provided in the vertical takeoff and landing craft generates a thrust for raising an airframe or generates a thrust for controlling the attitude of an airframe. The motor-integrated fan 1 may be applied to, for example, an air cushion vehicle, such as a hovercraft.

Figure 1:
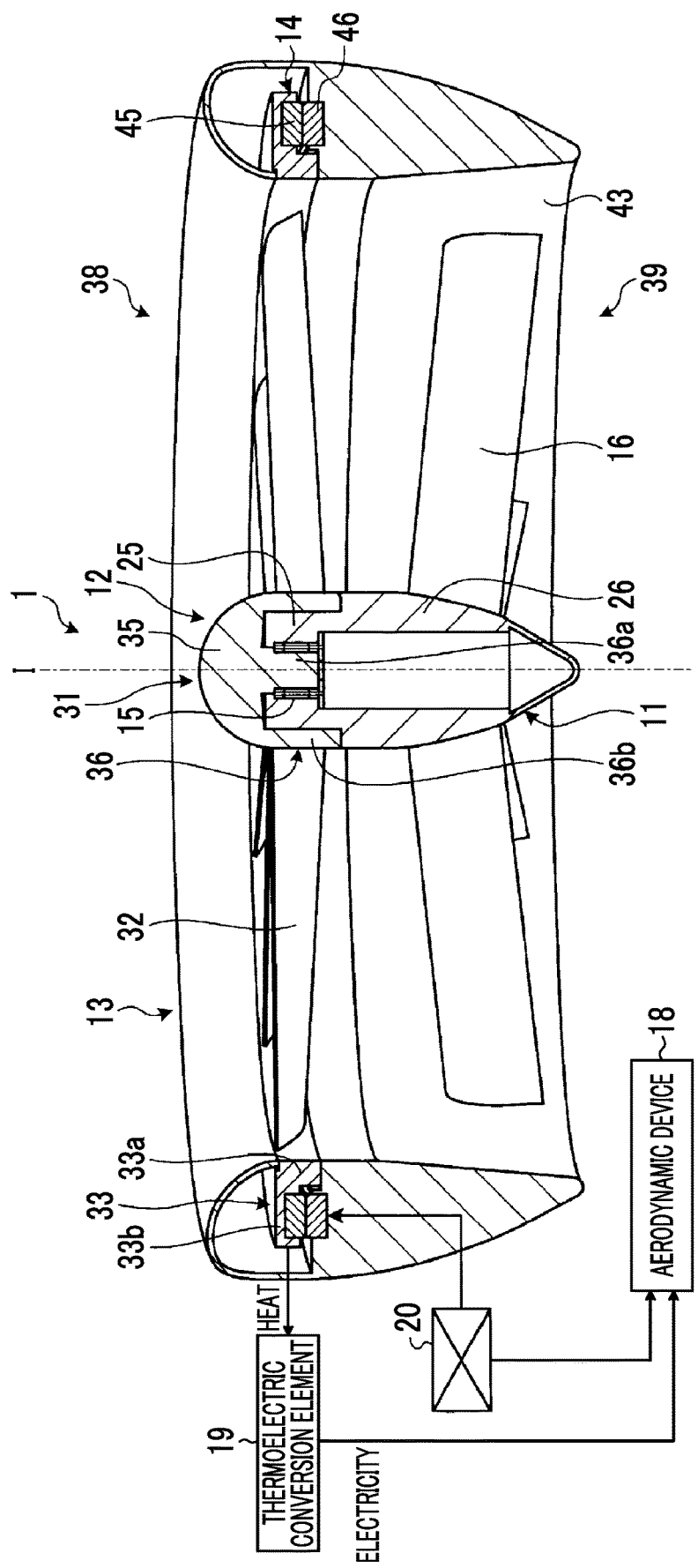
FIG. 1 is a cross-sectional view of a motor-integrated fan according to a first embodiment.
Figure 2:
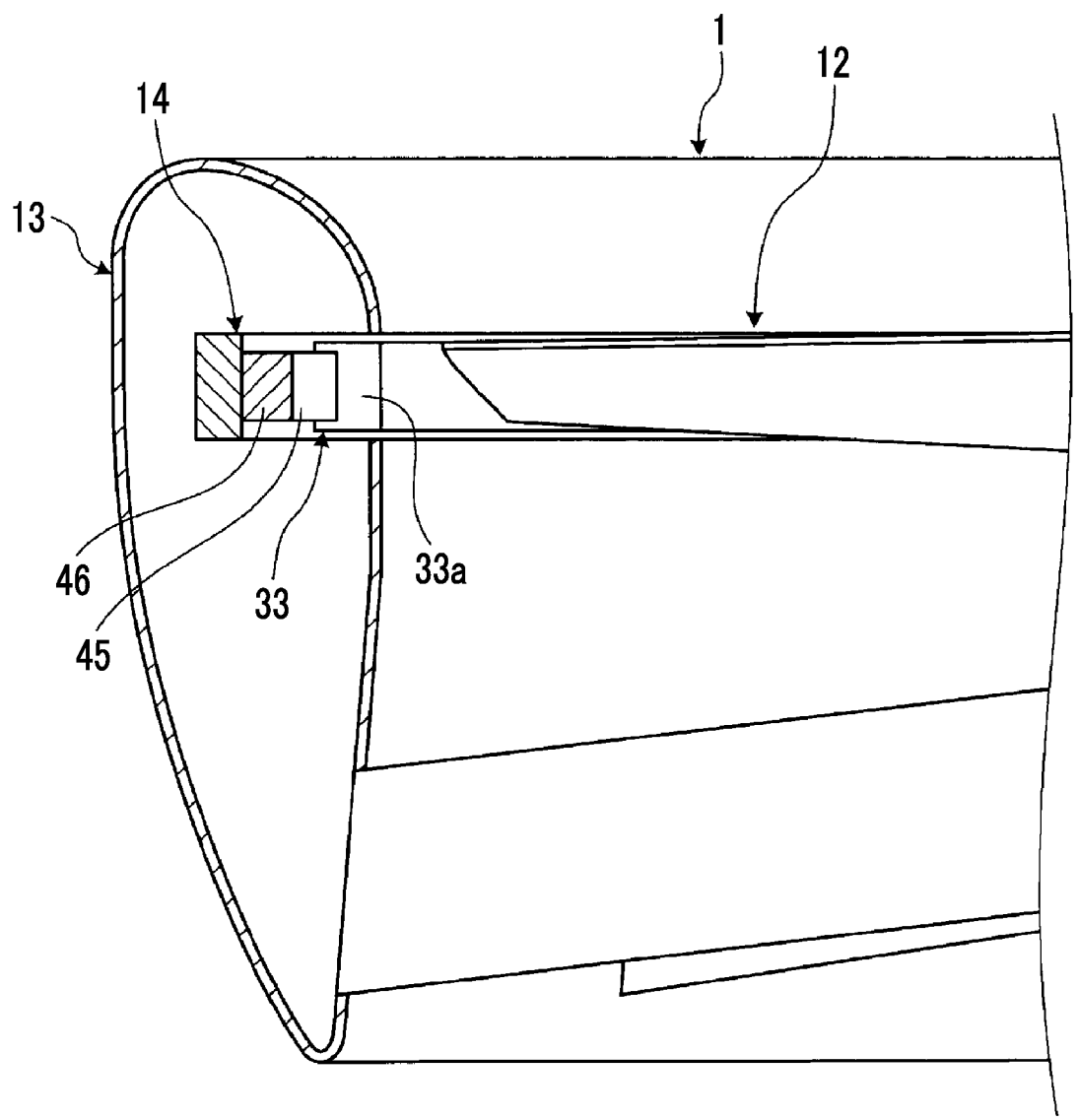
FIG. 2 is a partial cross-sectional view of a modification example of the motor-integrated fan according to the first embodiment.

The motor-integrated fan 1 will be described with reference to FIGS. 1 and 2. FIG. 1 is a cross-sectional view of the motor-integrated fan according to the first embodiment. FIG. 2 is a diagram illustrating a duct of the motor-integrated fan according to the first embodiment. The motor-integrated fan 1 is called a duct-type propeller or a ducted fan. For example, the motor-integrated fan 1 is used in a horizontal state where the axial direction of the motor-integrated fan 1 is a vertical direction, and takes air in from the upper side in the vertical direction and blows out air to the lower side in the vertical direction. The motor-integrated fan 1 may be used in a vertical state where the axial direction of the motor-integrated fan 1 is a horizontal direction.

The motor-integrated fan 1 is a fan in which one motor is integrally provided, and includes a shaft part 11, a rotation part 12, an outer peripheral part 13, a motor 14, a rolling bearing 15, rectification plates 16, a cooling unit 17, aerodynamic devices (flow acceleration devices) 18, a thermoelectric conversion element 19, and a control unit 20.

The shaft part 11 is provided at the center of a rotational axis I and serves as a supporting system (fixed side). Since the axial direction of the rotational axis I is a vertical direction in FIG. 1, the flow direction of air is a direction along the axial direction of the rotational axis I. The shaft part 11 includes a shaft-side fitting portion 25 that is a portion provided on the upstream side of the shaft part 11 in the axial direction of the rotational axis I, and a shaft body 26 that is a portion provided on the downstream side of the shaft-side fitting portion 25.

A hub 31 of the rotation part 12 to be described later is fitted to the shaft-side fitting portion 25. The shaft-side fitting portion 25 is formed in a cylindrical shape and is provided to protrude from the upstream end face of the shaft body 26 in the axial direction. A columnar space is formed in the shaft-side fitting portion 25 on the center side of the rotational axis I. A part of the hub 31 of the rotation part 12 is inserted into this space. Further, the outer peripheral side of the shaft-side fitting portion 25 is surrounded by a part of the hub 31 of the rotation part 12.

The shaft body 26 is formed in a substantially conical shape that is tapered toward the downstream side from the upstream side in the axial direction. For this reason, the outer peripheral surface of the shaft body 26 is formed of a surface that goes from the outside to the inside in a radial direction toward the downstream side from the upstream side in the axial direction. An internal space in which equipment can be installed is formed in the shaft body 26. Examples of the equipment include a control device, a camera, and the like. Further, radially inner end portions of the rectification plates 16 to be described later are connected to the outer peripheral surface of the shaft body 26.

The rotation part 12 is rotated about the shaft part 11 and serves as a rotating system (rotating side). The rotation part 12 is provided on the inflow side of the shaft part 11 into which air flows in the axial direction of the rotational axis I. The rotation part 12 includes a hub 31, a plurality of blades 32, and a rotation support ring 33.

The hub 31 is provided on the upstream side of the shaft part 11 in the axial direction, and is rotatably fitted to the shaft-side fitting portion 25. The hub 31 forms a part of the shaft part 11. The hub 31 includes a hub body 35 that is a portion provided on the upstream side in the axial direction and a hub-side fitting portion 36 that is a portion provided on the downstream side of the hub body 35. An upstream end face of the hub body 35 is a hemispherical surface that has a predetermined radius of curvature. The hub-side fitting portion 36 is formed in a shape complementary to the shaft-side fitting portion 25. The hub-side fitting portion 36 includes a central shaft 36a that is provided at the center of the rotational axis, and a cylindrical portion 36b that is formed on the outer peripheral side of the central shaft 36a and has a cylindrical shape. The central shaft 36a is inserted into the space that is formed in the shaft-side fitting portion 25 at the center of the rotational axis. The cylindrical portion 36b is provided to protrude from the downstream end face of the hub body 35 in the axial direction. The cylindrical portion 36b is disposed so as to surround the outer periphery of the shaft-side fitting portion 25. In this case, the rolling bearing 15 is provided between the inner peripheral surface of the shaft-side fitting portion 25 and the outer peripheral surface of the central shaft 36a of the hub 31.

Further, a surface that reaches the outer peripheral surface of the shaft body 26 from the end face of the hub body 35 via the outer peripheral surface of the cylindrical portion 36b is formed of a smooth surface without a stepped portion.

The plurality of blades 32 are provided to extend outward from the hub 31 in the radial direction, and are arranged at predetermined intervals in a circumferential direction. Each blade 32 is formed in the shape of an airfoil. A plane, which is formed by inflow-side end portions of the plurality of blades 32 orthogonal to the axial direction of the rotational axis I during the rotation of the plurality of blades 32, is a plane P of rotation.

The rotation support ring 33 is formed in an annular shape centered on the rotational axis I. The rotation support ring 33 is connected to the outer peripheral side of the plurality of blades 32 in the radial direction of the rotational axis I. The rotation support ring 33 includes an inner ring portion 33a that is a portion forming a part of the inner peripheral surface of the outer peripheral part 13 to be described later, and a flange portion 33b that is a portion provided to protrude on the outside of the inner ring portion 33a in the radial direction. The inner peripheral surface of the inner ring portion 33a provided on the inside in the radial direction forms a part of the inner peripheral surface of the outer peripheral part 13. Further, the radially outer end portion of each blade 32 is joined to the inner peripheral surface of the inner ring portion 33a by welding or the like. The flange portion 33b is provided on the upstream side of the inner ring portion 33a in the axial direction. The flange portion 33b holds permanent magnets 45 of the motor 14 to be described later. The flange portion 33b holds the permanent magnets 45 so that the permanent magnets 45 face the downstream side in the axial direction.

The hub 31, the plurality of blades 32, and the rotation support ring 33 of the rotation part 12 are integrally joined to each other, and the rotation part 12 is rotated about the hub 31.

The outer peripheral part 13 is provided outside the shaft part 11 in the radial direction and serves as the supporting system (fixed side). The outer peripheral part is a duct that is formed in an annular shape and generates a thrust by the rotation of the rotation part 12. The upstream opening of the outer peripheral part 13 (hereinafter, referred to as a duct 13) in the axial direction of the rotational axis I serves as a suction port 38 and the downstream opening thereof serves as a blow-out port 39.

An annular internal space, which houses the flange portion 33b of the rotation support ring 33 of the rotation part 12 and coils 46 of the motor 14 to be described later, is formed in the duct 13. The duct 13 holds the coils 46, which are provided at positions facing the permanent magnets 45 held by the rotation part 12, therein. The duct 13 sucks air from the suction port 38 and blows out the sucked air from the blow-out port 39 by the rotation of the rotation part 12 to generate a thrust.

The motor 14 is an outer periphery drive motor that supplies power to the rotation part 12 from the duct 13 side to rotate the rotation part 12. The motor 14 includes a rotor-side magnet that is provided on the rotation part 12 side and a stator-side magnet that is provided on the duct 13 side. In the first embodiment, the rotor-side magnet is the permanent magnets 45 and the stator-side magnet is the coils (electromagnets) 46. Configuration related to the handling of wiring and the like around the coils 46 is simplified since the supporting system is provided with the coils 46 in the first embodiment. However, the present invention is not particularly limited to this configuration. The coils may be used as the rotor-side magnet and the permanent magnets 45 may be used as the stator-side magnet.

The permanent magnets 45 are provided to be held by the flange portion 33b of the rotation support ring 33, and are arranged in an annular shape in the circumferential direction. Further, the permanent magnets 45 are adapted so that positive poles and negative poles are alternated at predetermined intervals in the circumferential direction. The permanent magnets 45 are provided at positions facing the coils 46 in the axial direction of the rotational axis I.

A plurality of coils 46 are provided to be held in the duct 13, are provided to face the respective poles of the permanent magnets 45, and are arranged in the circumferential direction. The coils 46 are provided at positions facing the permanent magnets 45, which are held by the rotation part 12, in the axial direction of the rotational axis I. That is, axial arrangement where the permanent magnets 45 and the coils 46 are arranged to face each other in the axial direction of the rotational axis I is made.

Axial arrangement where the permanent magnets 45 and the coils 46 are arranged to face each other in the axial direction of the rotational axis I is made, but a modification example shown in FIG. 2 may be made. FIG. 2 is a partial cross-sectional view of a modification example of the motor-integrated fan according to the first embodiment. Radial arrangement where the permanent magnets 45 and the coils 46 are arranged to face each other in the radial direction of the rotational axis I is made in the modification example shown in FIG. 2.

The rotation support ring 33 holding the permanent magnets 45 is adapted so that the flange portion 33b is omitted, and holds the permanent magnets 45 on the outer peripheral side of the inner ring portion 33a.

The permanent magnets 45 are provided to be held on the outer peripheral side of the inner ring portion 33a of the rotation support ring 33, and are arranged in an annular shape in the circumferential direction. The permanent magnets 45 are provided at positions facing the coils 46 in the radial direction of the rotational axis I.

A plurality of coils 46 are provided to be held in the duct 13, are provided to face the respective poles of the permanent magnets 45, and are arranged in the circumferential direction. The coils 46 are provided at positions facing the permanent magnets 45, which are held by the rotation part 12, in the radial direction of the rotational axis I. Radial arrangement where the permanent magnets 45 and the coils 46 are arranged to face each other in the radial direction of the rotational axis I as described above may be made.

The rolling bearing 15 is provided between the inner peripheral surface of the shaft-side fitting portion 25 of the shaft part 11 and the outer peripheral surface of the central shaft 36a of the hub 31 of the rotation part 12. The rolling bearing 15 connects the shaft part 11 to the rotation part 12 while allowing the rotation of the rotation part 12 with respect to the shaft part 11. The rolling bearing 15 is, for example, a ball bearing or the like.

The rectification plates 16 are provided to connect the shaft part 11 to the duct 13. The rectification plates 16 are provided on the downstream side of the rotation part 12 in the axial direction of the rotational axis I. That is, the rectification plates 16 are provided at the position of a downstream portion 43 of the duct 13 in the axial direction. A plurality of rectification plates 16 are arranged in the circumferential direction of the rotational axis I. Further, the rectification plates 16 are formed in a streamlined shape, such as the shape of an airfoil, and rectify air flowing in from the rotation part 12. The shape of the rectification plate 16 is not limited to the shape of an airfoil and may be the shape of a flat plate.

Figure 3:
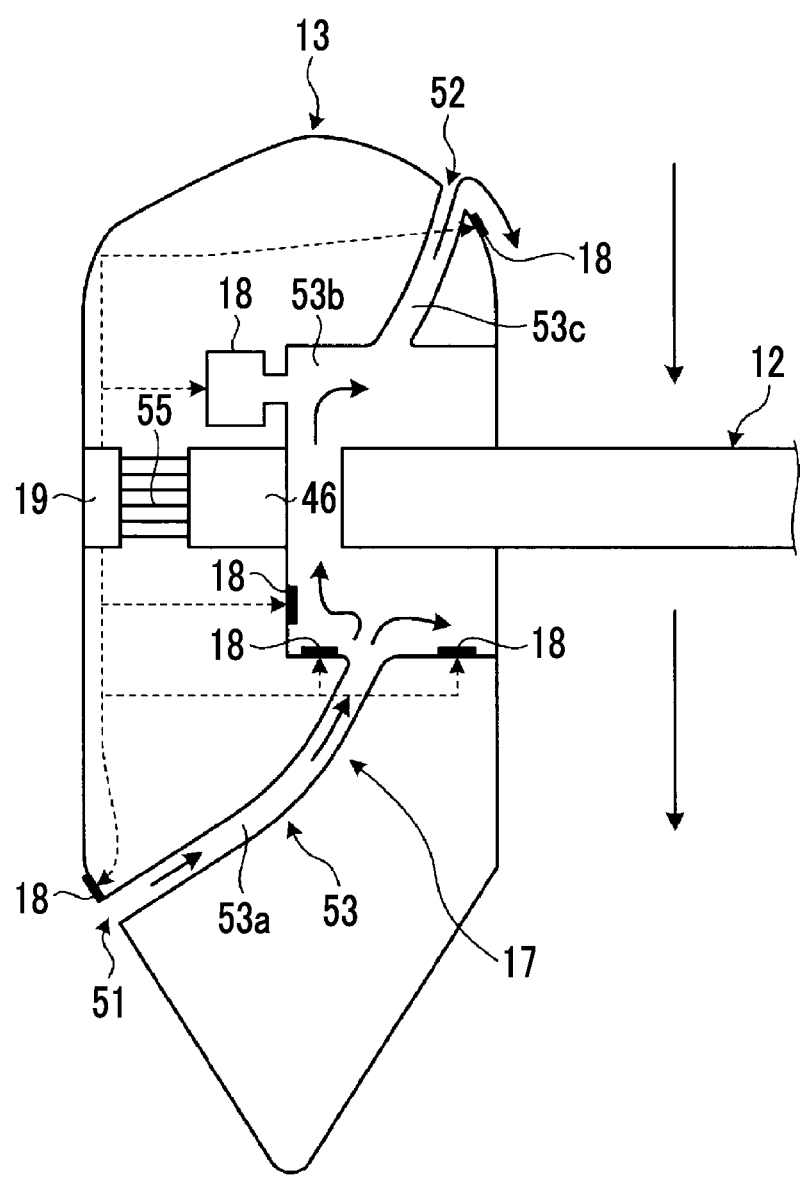
FIG. 3 is a diagram illustrating an example of a duct of the motor-integrated fan according to the first embodiment.

Next, the cooling unit 17 will be described with reference to FIG. 3. In FIGS. 3 to 9, the present invention will be applied to a case where the permanent magnets 45 and the coils 46 of the motor 14 are in radial arrangement and will be described. The cooling unit 17 cools a heat generating part, which generates heat due to the operation of the motor 14, with cooling air. The heat generating part is, for example, the coils 46 of the motor 14. Since the coil 46 is simplified and shown in FIG. 2, the position of the coil 46 is different from the actual position thereof. Since the coils 46 are provided in the duct 13, the cooling unit 17 is provided in the duct 13 to cool the coils 46.

The cooling unit 17 includes an air intake port 51 that takes cooling air in, an air discharge port 52 that discharges cooling air, and a cooling flow channel 53 that leads to the air discharge port 52 from the air intake port 51.

The air intake port 51 is formed on the outer peripheral surface of the duct 13. The air intake port 51 is provided on the downstream side (blow-out port 39 side) of the rotation part 12 in the axial direction of the rotational axis I. Pressure around a portion where the air intake port 51 is formed is atmospheric pressure.

The air discharge port 52 is formed on the inner peripheral surface of the duct. The air discharge port 52 is provided on the upstream side of the rotation part 12 in the flow direction of air flowing toward the blow-out port 39 from the suction port 38. Pressure around a portion where the air discharge port 52 is formed is more negative than pressure around the air intake port 51. That is, pressure around a portion where the air discharge port 52 is formed is lower than the atmospheric pressure.

Further, the air intake port 51 is formed so as to have an opening area larger than the opening area of the air discharge port 52. In other words, the air discharge port 52 is formed so as to have an opening area smaller than the opening area of the air intake port 51.

The cooling flow channel 53 includes flow channels 53a that lead to the coils 46 from the air intake port 51, an internal space 53b of the duct 13 in which the coils 46 are arranged, and flow channels 53c that lead to the air discharge port 52 from the coils 46. The cooling flow channel 53 guides the air, which is taken in from the air intake port 51, to the internal space 53b as cooling air, introduces the cooling air into the internal space 53b, and guides the cooling air of the internal space 53b to the air discharge port 52.

The cooling unit 17 removes heat from the coils 46 by taking air in from the air intake port 51, blowing cooling air to the coils 46 in the internal space 53b, and discharging the cooling air, which has been blown to the coils 46, from the air discharge port 52.

The flow acceleration device 18 causes the cooling air to flow. Examples of the flow acceleration device 18 include a plasma actuator, a synthetic jet, a vortex generator, and the like. The flow acceleration devices 18 are provided on the air intake port 51, the air discharge port 52, and the cooling flow channel 53. The flow acceleration devices 18 are provided on the air intake port 51, the air discharge port 52, and the cooling flow channel 53 in the first embodiment. However, the flow acceleration devices 18 may be provided on at least one of the air intake port 51, the air discharge port 52, and the cooling flow channel 53, and portions on which the flow acceleration devices 18 are provided are not particularly limited.

For example, a plasma actuator is applied as the flow acceleration device 18 provided on the air intake port 51, and is provided so that air flows toward the air intake port 51. Specifically, the flow acceleration device 18 is provided on the outer peripheral surface of the duct 13 near the air intake port 51. The flow acceleration device 18 provided on the air intake port 51 may be provided on the flow channel 53a of the cooling flow channel 53 near the air intake port 51.

For example, a plasma actuator is applied as the flow acceleration device 18 provided on the air discharge port 52, and is provided so that air is discharged from the air discharge port 52. Specifically, the flow acceleration device 18 is provided on the inner peripheral surface of the duct 13 near the air discharge port 52. The flow acceleration device 18 provided on the air discharge port 52 may be provided on the flow channel 53c of the cooling flow channel 53 near the air discharge port 52.

For example, a plasma actuator and a synthetic jet are applied as the flow acceleration devices 18 provided in the internal space 53b, and are provided so that cooling air flows to the flow channels 53c from the flow channels 53a. Specifically, the flow acceleration devices 18 are provided on the inner surface of the internal space, and are provided at the pool points of cooling air staying in the internal space.

The thermoelectric conversion element 19 is provided in the duct 13, and generates electric power using heat that is generated from the coils 46. The thermoelectric conversion element 19 converts thermal energy generated from the coils 46 into electric energy, and supplies electric power to the flow acceleration devices 18. The thermoelectric conversion element 19 includes high-temperature parts that are provided on the coil 46 side and low-temperature parts that are provided on portions of which the temperatures are lower than the temperatures of the high-temperature parts. Specifically, the low-temperature parts of the thermoelectric conversion element 19 are provided to be positioned on the outer peripheral surface of the duct 13, and the high-temperature parts thereof are provided to face the coils 46. Further, a heat transfer member 55 is provided between each high-temperature part and each coil 46, and the heat of the coils 46 is input to the high-temperature parts of the thermoelectric conversion element 19 through the heat transfer members 55. The thermoelectric conversion element 19 may be adapted to output the generated electric power to the control unit 20. In this case, the electric power may be supplied to the flow acceleration devices 18 from the control unit 20.

The control unit 20 is connected to each part of the motor-integrated fan 1 and controls the motor-integrated fan 1 by controlling each part. The control unit 20 is connected to the coils 46. The control unit 20 controls the rotation of the rotation part 12 by controlling the magnetic fields of the coils 46. Further, the control unit 20 is connected to the flow acceleration devices 18. The control unit 20 controls the operation of the flow acceleration devices 18.

The motor-integrated fan 1 supplies power, which is caused by the magnetic fields, to the rotation part 12 from the duct 13 side by the motor 14, so that the rotation part 12 is rotated. In a case where the rotation part 12 is rotated, the motor-integrated fan 1 sucks air from the suction port 38 and blows out air to the blow-out port 39. The air blown out of the rotation part 12 generates a thrust by flowing along the inner peripheral surface of the duct 13.

Further, since the flow speed of air flowing along the air discharge port 52 is increased in a case where the rotation part 12 is rotated, pressure around the air discharge port 52 becomes lower than the atmospheric pressure. Accordingly, since pressure around the air discharge port 52 is more negative than pressure around the air intake port 51, the cooling unit 17 takes air in from the air intake port 51 and causes the taken-in air to flow in the cooling flow channel 53 as cooling air. The cooling air flowing in the cooling flow channel 53 is blown to the coils 46 in the internal space 53b. The cooling air blown to the coils 46 is discharged from the air discharge port 52. Accordingly, the cooling unit 17 removes heat from the coils 46 with the cooling air.

Figure 4:
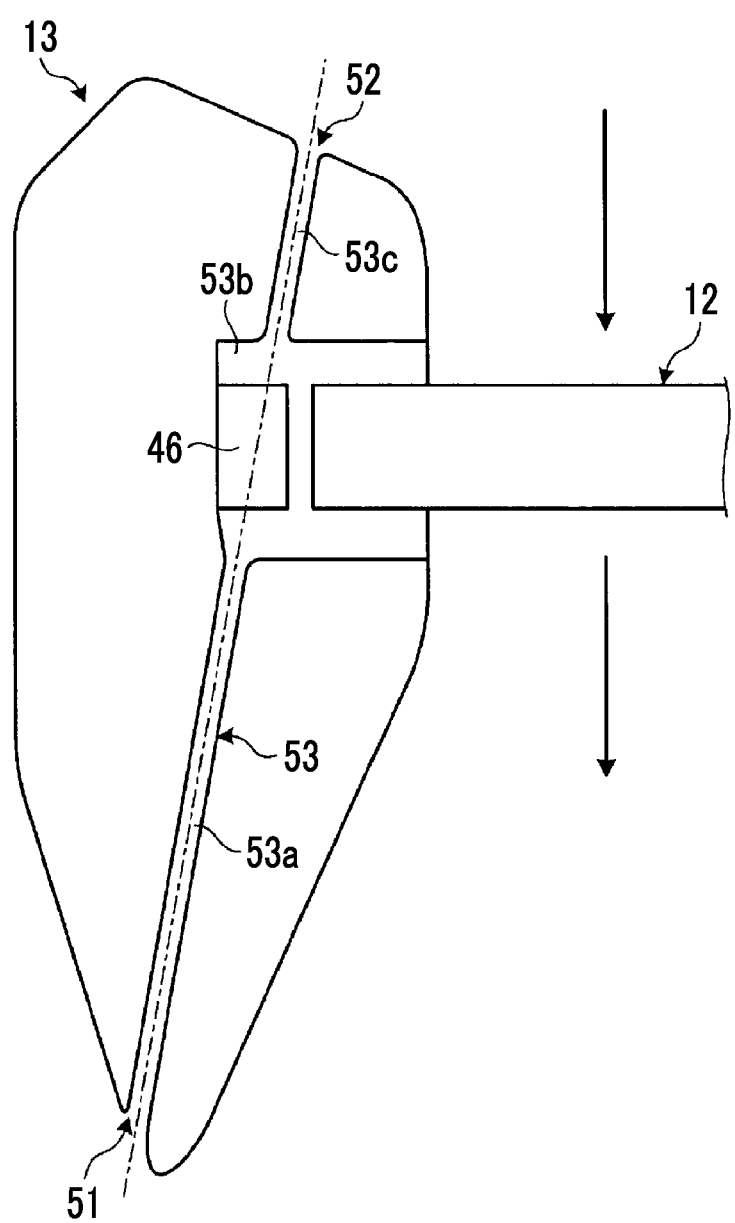
FIG. 4 is a diagram illustrating an example of a cooling unit of the motor-integrated fan according to the first embodiment.
Figure 5:
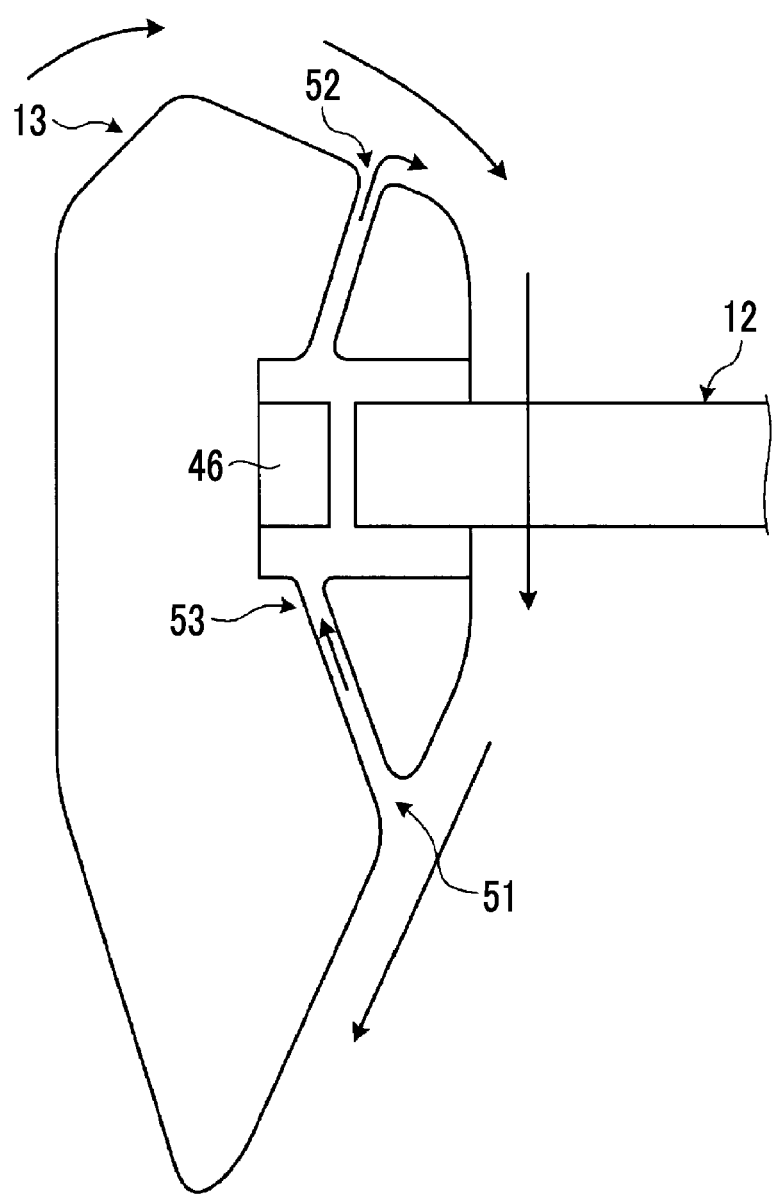
FIG. 5 is a diagram illustrating an example of the cooling unit of the motor-integrated fan according to the first embodiment.
Figure 6:
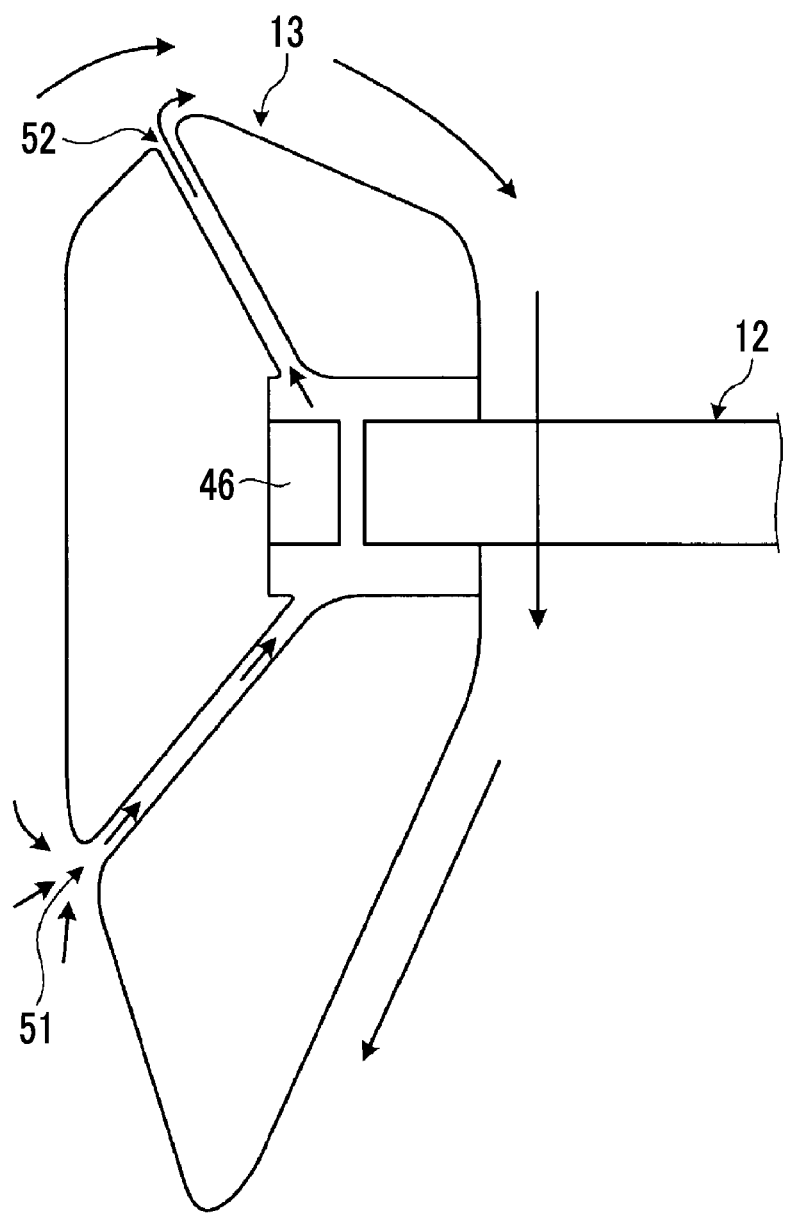
FIG. 6 is a diagram illustrating an example of the cooling unit of the motor-integrated fan according to the first embodiment.

Next, other examples of the cooling unit 17 will be described with reference to FIGS. 4 to 6. FIGS. 4 to 6 are diagrams illustrating examples of the cooling unit of the motor-integrated fan according to the first embodiment. A cooling flow channel 53 of a cooling unit 17 shown in FIG. 4 is formed in a linear shape toward an air discharge port 52 from an air intake port 51. Further, the cooling flow channel 53 formed in a linear shape is formed so as to cross the coils 46 in the internal space 53b.

For this reason, since the cooling flow channel 53 is formed in a linear shape in the cooling unit 17 shown in FIG. 4, cooling air smoothly flows. Accordingly, a pressure loss in the cooling flow channel 53 can be reduced.

In a cooling unit 17 shown in FIG. 5, the air intake port 51 shown in FIG. 3 is formed on the inner peripheral surface of the duct 13. The air intake port 51 is provided on the downstream side of the rotation part 12 in the flow direction of air flowing toward the blow-out port from the suction port 38. Pressure around a portion where the air intake port 51 is formed is more positive than pressure around the air discharge port 52. That is, pressure around a portion where the air intake port 51 is formed is higher than pressure around the air discharge port 52.

Accordingly, in the cooling unit 17 shown in FIG. 5, pressure around the air discharge port 52 is more negative than pressure around the air intake port 51. For this reason, the cooling unit 17 takes air in from the air intake port 51 and causes the taken-in air to flow in the cooling flow channel 53 as cooling air.

In a cooling unit 17 shown in FIG. 6, the air discharge port 52 shown in FIG. 3 is formed on the outer peripheral surface of the duct 13. The air discharge port 52 is provided closer to the suction port 38 than the air intake port 51. Pressure around a portion where the air discharge port 52 is formed is more negative than pressure around the air intake port 51.

That is, pressure around a portion where the air discharge port 52 is formed is lower than pressure around the air intake port 51.

Accordingly, in the cooling unit 17 shown in FIG. 6, pressure around the air discharge port 52 is more negative than pressure around the air intake port 51. For this reason, the cooling unit 17 takes air in from the air intake port 51 and causes the taken-in air to flow in the cooling flow channel 53 as cooling air.

Figure 7:
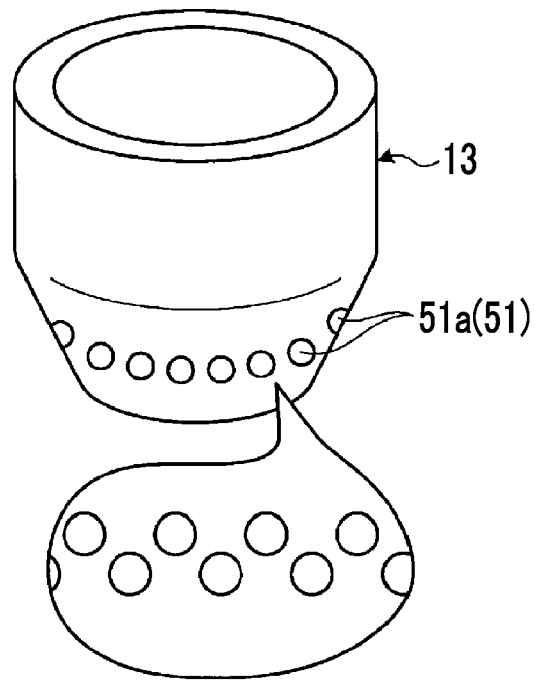
FIG. 7 is a diagram illustrating an example of an air intake port of the motor-integrated fan according to the first embodiment.
Figure 8:
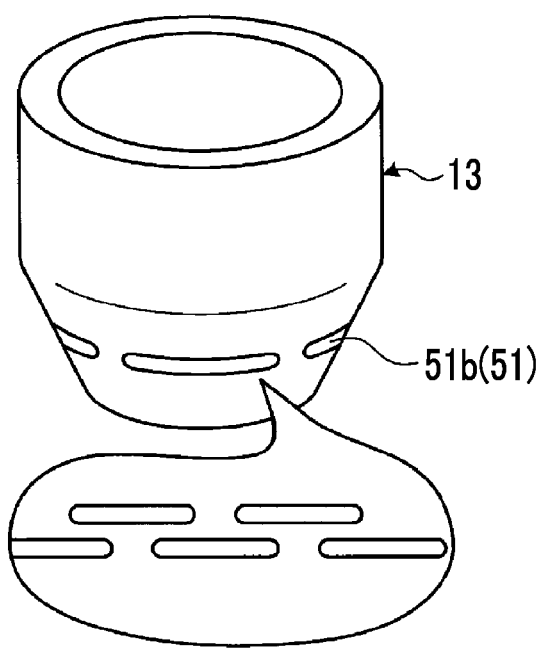
FIG. 8 is a diagram illustrating an example of the air intake port of the motor-integrated fan according to the first embodiment.

Next, other examples of the air intake port 51 of the cooling unit 17 will be described with reference to FIGS. 7 and 8. FIGS. 7 and 8 are diagrams illustrating examples of the air intake port of the motor-integrated fan according to the first embodiment.

An air intake port 51 shown in FIG. 7 is adapted to include a plurality of holes 51a. The holes 51a are formed on the outer peripheral surface of the duct 13 and are formed side by side in the circumferential direction. The holes 51a are formed in a line or a plurality of lines in the circumferential direction. In a case where the holes 51a are formed in a plurality of lines in the circumferential direction, the plurality of holes 51a are arranged in zigzag along the circumferential direction.

An air intake port 51 shown in FIG. 8 is adapted to include slits 51b extending in a longitudinal direction. The slits 51b are formed on the outer peripheral surface of the duct 13 and are formed so that the longitudinal direction of each slit is the circumferential direction. The slits 51b are formed side by side in the circumferential direction. The slits 51b are formed in a line or a plurality of lines in the circumferential direction. In a case where the slits 51b are formed in a plurality of lines in the circumferential direction, the plurality of slits 51b are arranged in zigzag along the circumferential direction.

Figure 9:
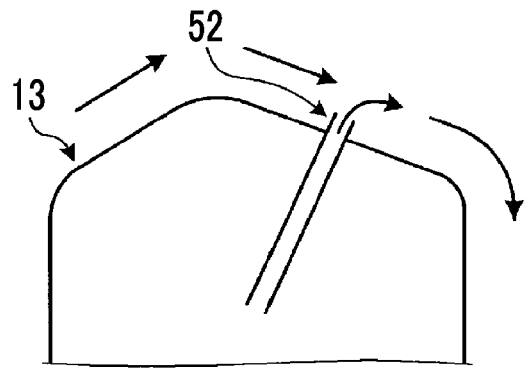
FIG. 9 is a diagram illustrating an example of an air discharge port of the motor-integrated fan according to the first embodiment.

Next, another example of the air discharge port 52 of the cooling unit 17 will be described with reference to FIG. 9. FIG. 9 is a diagram illustrating an example of the air discharge port of the motor-integrated fan according to the first embodiment. An air discharge port 52 shown in FIG. 9 is provided to protrude from the surface of a portion where the air discharge port 52 is formed. That is, in a case where the air discharge port 52 is to be formed on the inner peripheral surface of the duct 13, the air discharge port 52 is formed to protrude from the inner peripheral surface of the duct 13. Further, in a case where the air discharge port 52 is to be formed on the outer peripheral surface of the duct 13, the air discharge port 52 is formed to protrude from the outer peripheral surface of the outer peripheral part (duct) 13. In this case, the air discharge port 52 may be, for example, a nozzle type, a line type, or an anemo type, and the shape of the air discharge port 52 is not particularly limited.

Figure 10:
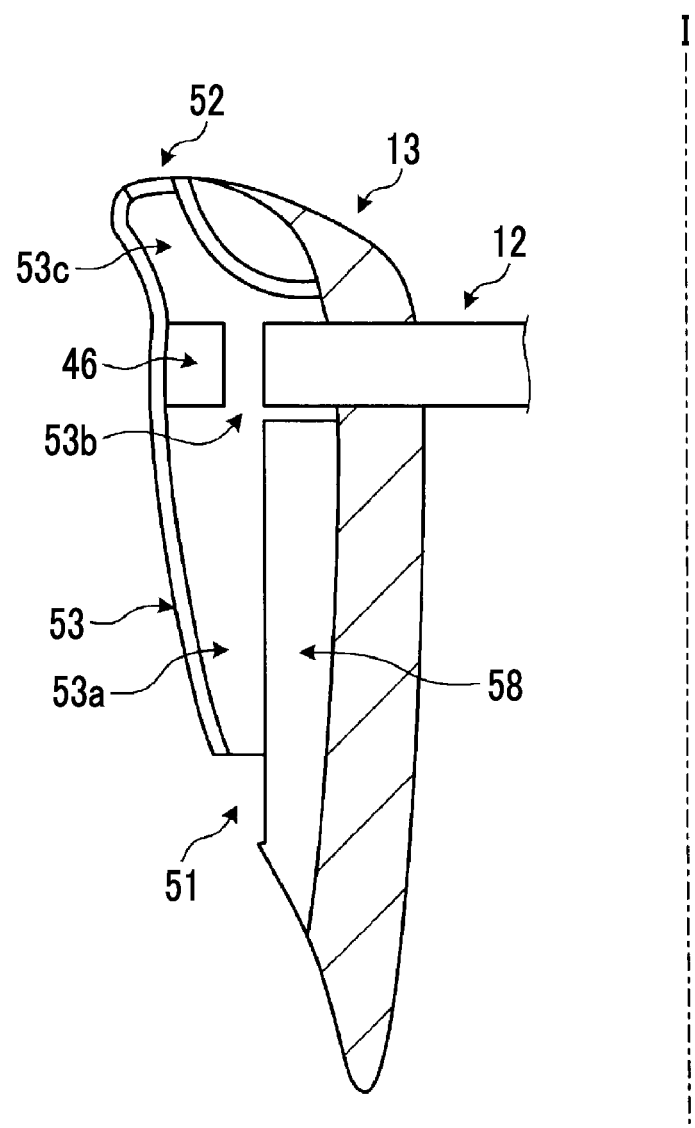
FIG. 10 is an example of the air intake port and the air discharge port of the motor-integrated fan according to the first embodiment.

Next, another example of the cooling unit 17 will be described with reference to FIG. 10. A cooling unit 17 shown in FIG. 10 is adapted so that a cooling flow channel 53 is not formed in a linear shape as shown in FIG. 10. The cooling unit 17 shown in FIG. 10 is formed so that the cooling flow channel 53 is curved toward the air discharge port 52 from the air intake port 51. A ventilation guide 58 guiding cooling air taken in from the air intake port 51 is provided in the curved cooling flow channel 53. The ventilation guide 58 guides cooling air toward the coils from the air intake port 51 and guides cooling air toward the air discharge port 52 from the coils 46.

According to the first embodiment, as described above, cooling air can be taken in from the air intake port 51 using the negative pressure of the air discharge port 52 with respect to the air intake port 51, and cooling air having passed by the coils 46 serving as the heat generating part can be discharged from the air discharge port 52. For this reason, heat can be suitably removed from the coils 46 with cooling air. Further, since the negative pressure of the air discharge port 52 with respect to the air intake port 51 is used, the reduction of the fan performance of the motor-integrated fan 1 can be suppressed.

Further, according to the first embodiment, in a case where the coils 46 are provided in the duct 13, the cooling unit 17 shown in FIG. 3 can take air in from the outer peripheral surface of the duct 13, which is under the atmospheric pressure, and can discharge air from the inner peripheral surface of the duct 13 on the upstream side of the rotation part 12 where pressure is reduced. For this reason, since the air intake port 51 and the air discharge port 52 can be provided at positions where a pressure difference between the air intake port 51 and the air discharge port 52 is increased, cooling air can be caused to suitably flow in the cooling flow channel 53.

Furthermore, according to the first embodiment, in a case where the coils 46 are provided in the duct 13, the cooling unit 17 shown in FIG. 5 can take air in from the inner peripheral surface of the duct 13 and can discharge air from the inner peripheral surface of the duct 13. For this reason, since a pressure difference can be generated between the air intake port 51 and the air discharge port 52 even in a case where it is difficult to provide the air intake port 51 and the air discharge port 52 on the outer peripheral surface of the duct 13, cooling air can be caused to suitably flow in the cooling flow channel 53.

Moreover, according to the first embodiment, in a case where the coils 46 are provided in the duct 13, the cooling unit 17 shown in FIG. 6 can take air in from the outer peripheral surface of the duct 13 and can discharge air from the outer peripheral surface of the duct 13. For this reason, since a pressure difference can be generated between the air intake port 51 and the air discharge port 52 even in a case where it is difficult to provide the air intake port 51 and the air discharge port 52 on the inner peripheral surface of the duct 13, cooling air can be caused to suitably flow in the cooling flow channel 53.

Further, according to the first embodiment, since the cooling flow channel 53 is formed in a linear shape as shown in FIG. 4, a pressure loss in the cooling flow channel 53 can be suppressed. Accordingly, cooling air can be caused to more suitably flow in the cooling flow channel 53.

Furthermore, according to the first embodiment, since the air intake port 51 is formed so as to have an opening area larger than the opening area of the air discharge port 52, much air can be taken in from the air intake port 51 and the flow speed of cooling air at the air discharge port 52 can be increased.

Moreover, according to the first embodiment, the plurality of holes 51a can be formed to provide an air intake port 51 or the slits 51b can be formed to provide an air intake port 51.

Further, according to the first embodiment, since the air discharge port 52 is provided to protrude from the inner peripheral surface or the outer peripheral surface of the duct 13 as shown in FIG. 9, the flow speed of air at the air discharge port 52 can be increased. Accordingly, the negative pressure of the air discharge port 52 can be increased.

Furthermore, according to the first embodiment, since the ventilation guide 58 is provided in the cooling flow channel 53 as shown in FIG. 10, cooling air can be appropriately guided to the coils 46 from the air intake port 51 and to the air discharge port 52 from the coils 46. For this reason, cooling air can be caused to more suitably flow in the cooling flow channel 53.

Moreover, according to the first embodiment, since the flow acceleration devices 18 are provided, cooling air can be caused to suitably flow. Accordingly, cooling efficiency caused by cooling air can be improved.

Further, according to the first embodiment, electric power can be generated by the thermoelectric conversion element 19 using the heat of the coils 46 and can be supplied to the flow acceleration devices 18. For this reason, an external power supply does not need to be provided and the configuration of the motor-integrated fan 1 can be simplified.

Furthermore, according to the first embodiment, since a vertical takeoff and landing craft in which the motor-integrated fan 1 is mounted on an airframe can use the motor-integrated fan 1 in which heat is removed from the coils 46 and the reduction of fan performance is suppressed, a thrust generated by the motor-integrated fan 1 can be appropriately obtained.

The coils 46 of the motor 14 are applied as the heat generating part in the first embodiment, but the heat generating part may be elements other than the coils 46. As long as the heat generating part generates heat in a case where the motor 14 is operated, the heat generating part is not particularly limited.

Second Embodiment

Figure 11:
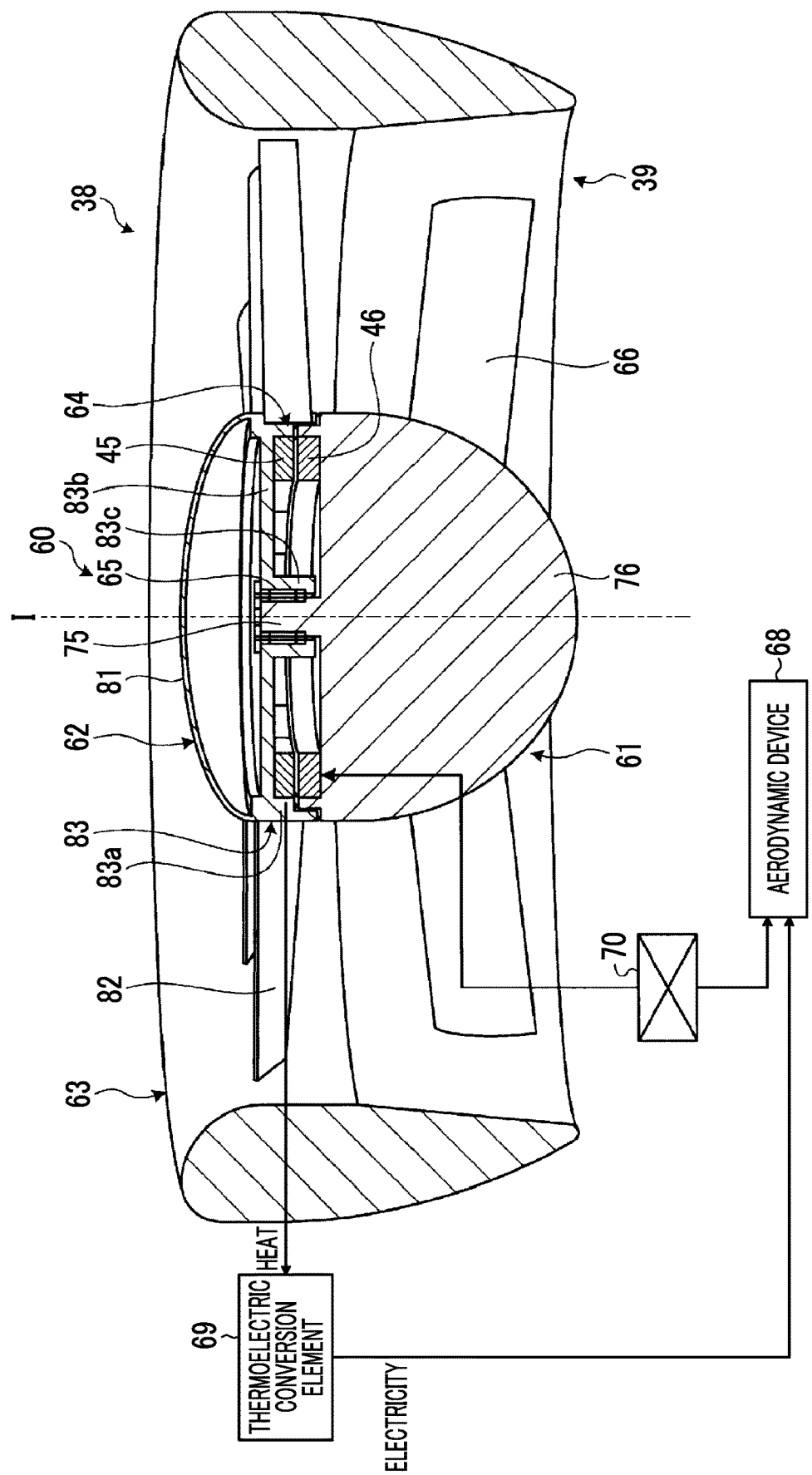
FIG. 11 is a cross-sectional view of a motor-integrated fan according to a second embodiment.
Figure 12:
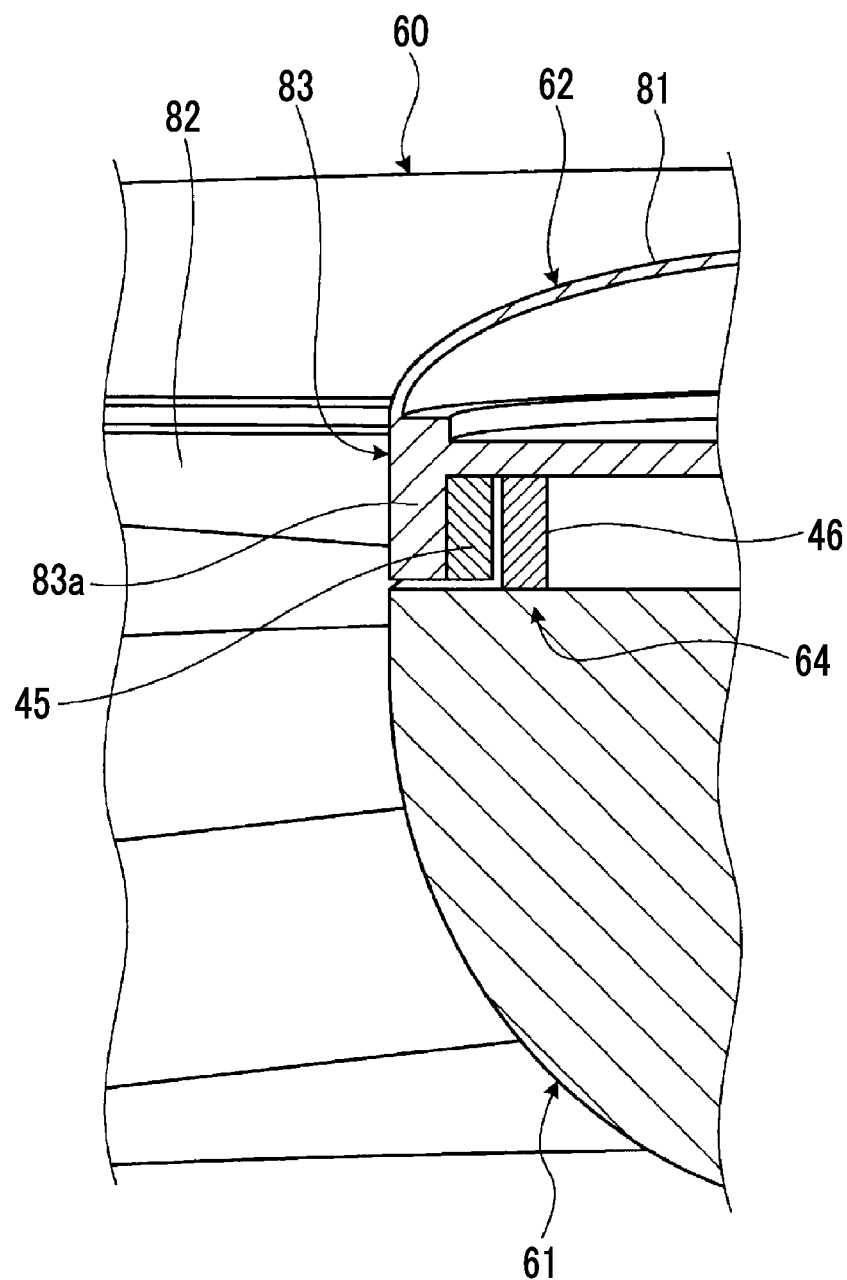
FIG. 12 is a partial cross-sectional view of a modification example of the motor-integrated fan according to the second embodiment.
Figure 13:
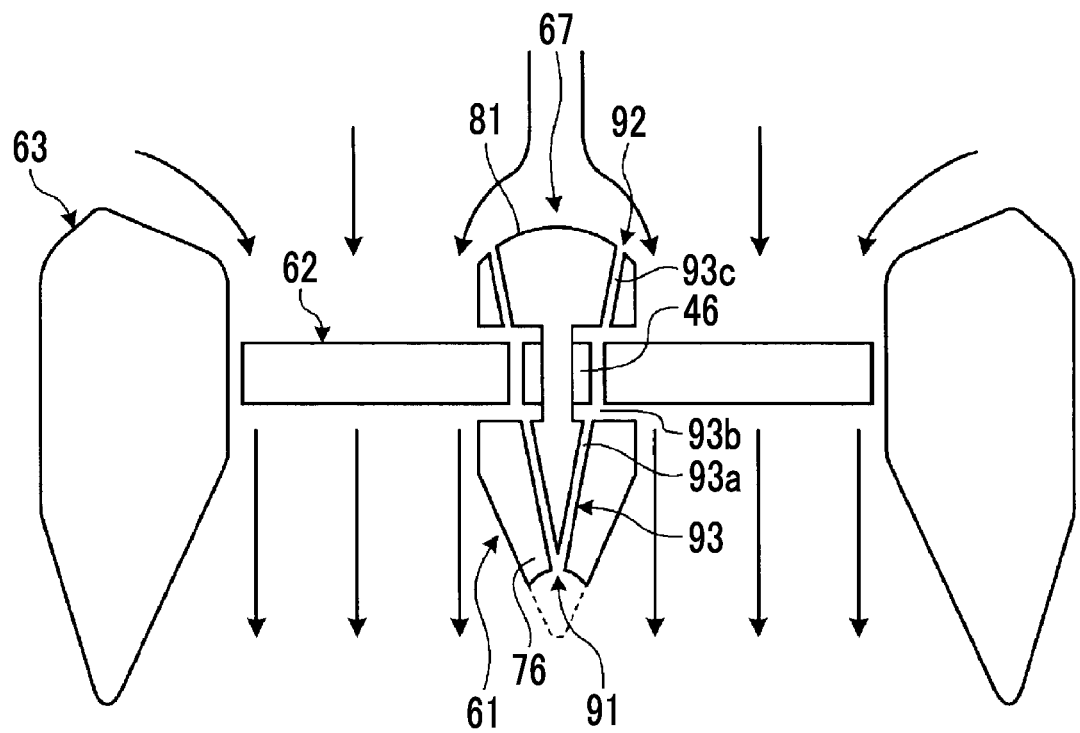
FIG. 13 is a diagram illustrating an example of a shaft part of the motor-integrated fan according to the second embodiment.
Figure 14:
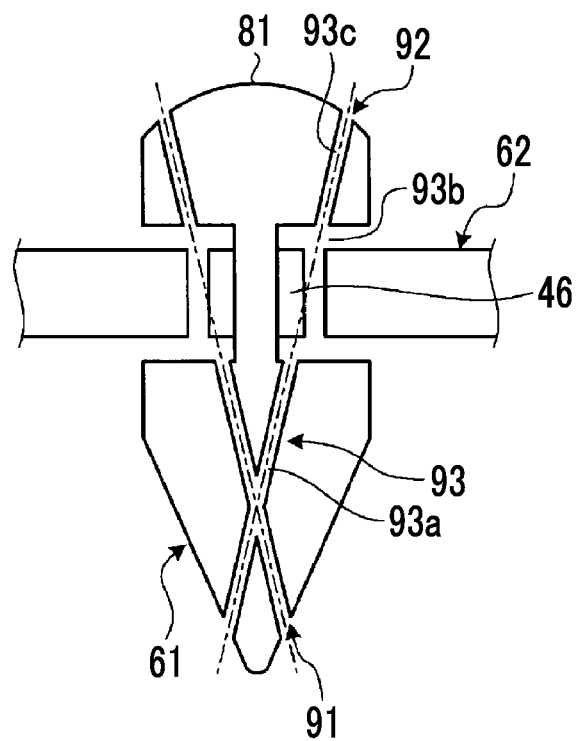
FIG. 14 is a diagram illustrating an example of a cooling unit of the motor-integrated fan according to the second embodiment.
Figure 15:
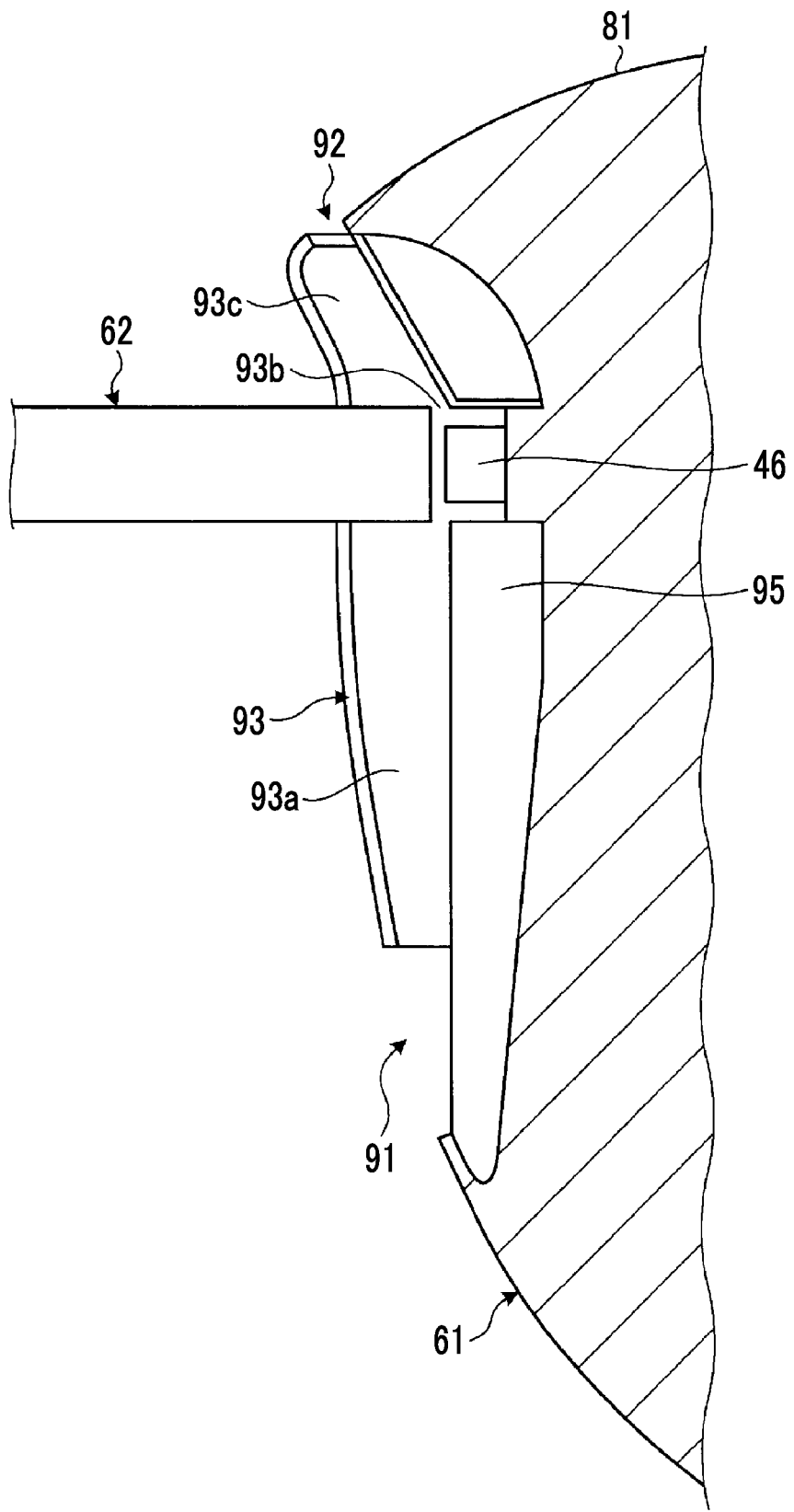
FIG. 15 is an example of an air intake port and an air discharge port of the motor-integrated fan according to the second embodiment.

Next, a motor-integrated fan 60 according to a second embodiment will be described with reference to FIGS. 11 to 15. In the second embodiment, in order to avoid repeated description, portions different from those of the first embodiment will be described and portions having the same configuration as the configuration of the first embodiment will be denoted by the same reference numerals as the reference numerals of the first embodiment and will be described. FIG. 11 is a diagram illustrating an example of a shaft part of the motor-integrated fan according to the second embodiment. FIG. 12 is a partial cross-sectional view of a modification example of the motor-integrated fan according to the second embodiment. FIG. 13 is a diagram illustrating an example of the shaft part of the motor-integrated fan according to the second embodiment. FIG. 14 is a diagram illustrating an example of a cooling unit of the motor-integrated fan according to the second embodiment. FIG. 15 is an example of an air intake port and an air discharge port of the motor-integrated fan according to the second embodiment.

The motor 14 of the motor-integrated fan 1 according to the first embodiment is a motor of which the outer periphery is driven, but a motor 64 of the motor-integrated fan 60 according to the second embodiment is a motor of which the inner periphery is driven. For this reason, the motor-integrated fan 60 according to the second embodiment cools coils 46 of the motor 64, of which the inner periphery is driven, by a cooling unit 67.

The motor-integrated fan 60 according to the second embodiment includes a shaft part 61, a rotation part 62, a duct 63, a motor 64, a rolling bearing 65, rectification plates 66, a cooling unit 67, aerodynamic devices (flow acceleration devices) 68, a thermoelectric conversion element 69, and a control unit 70. Since the rolling bearing 65, the rectification plates 66, the flow acceleration devices 68, the thermoelectric conversion element 69, and the control unit 70 are substantially the same as those of the first embodiment, the description thereof will be omitted.

The shaft part 61 is provided at the center of a rotational axis I and serves as a supporting system (fixed side). The shaft part 61 includes a shaft-side fitting portion 75 that is a portion provided on the upstream side of the shaft part 61 in an axial direction of the rotational axis I, and a shaft body 76 that is a portion provided on the downstream side of the shaft-side fitting portion 75.

A rotation support ring 83 of the rotation part 62 to be described later is fitted to the shaft-side fitting portion 75. The shaft-side fitting portion 75 is formed in a columnar shape, and is provided on the upstream end face of the shaft body 76 so as to protrude from the center of the rotational axis I to the upstream side in the axial direction. The outer peripheral side of the shaft-side fitting portion 75 is surrounded by the rotation support ring 83 of the rotation part 62.

The shaft body 76 is formed in a hemispherical shape that is convex toward the downstream side from the upstream side in the axial direction. For this reason, the outer peripheral surface of the shaft body 76 is formed of a surface that goes from the outside to the inside in a radial direction toward the downstream side from the upstream side in the axial direction. Further, the shaft body 76 holds the coils 46 on the upstream end face thereof in the axial direction at positions on the outer peripheral side of the shaft-side fitting portion 75. An internal space in which equipment can be installed may be formed in the shaft body 76 as in the first embodiment.

The rotation part 62 is rotated about the shaft part 61 and serves as a rotating system (rotating side). The rotation part 62 is provided on the inflow side of the shaft part 61 into which air flows in the axial direction of the rotational axis I. The rotation part 62 includes a hub 81, a plurality of blades 82, and a rotation support ring 83.

The hub 81 is provided on the upstream side of the shaft part 61 in the axial direction, and forms a part of the shaft part 61. The upstream end face of the hub 81 is formed as a spherical surface having a predetermined radius of curvature.

The rotation support ring 83 is provided on the downstream side of the hub 81 in the axial direction and is integrated with the hub 81. The rotation support ring 83 is rotatably fitted to the shaft-side fitting portion 75. The rotation support ring 83 is formed in an annular shape centered on the rotational axis I. The rotation support ring 83 includes an outer ring portion 83a that is provided on the outside in the radial direction, a flange portion 83b that is a portion provided to protrude on the inside of the outer ring portion 83a in the radial direction, and an inner ring portion 83c that is a portion provided on the inside of the flange portion 83b in the radial direction. The outer ring portion 83a is formed in a cylindrical shape, and includes a smooth outer peripheral surface without a stepped portion with respect to the outer peripheral surface of the shaft part 61. The radially inner end portion of each blade 82 is joined to the outer peripheral surface of the outer ring portion 83a by welding or the like. The flange portion 83b is provided on the upstream side of the outer ring portion 83a in the axial direction. The flange portion 83b holds permanent magnets 45 of the motor 64 to be described later. The flange portion 83b holds the permanent magnets 45 so that the permanent magnets 45 face the downstream side in the axial direction. The inner ring portion 83c is formed in a cylindrical shape, and is provided so as to surround the shaft-side fitting portion 75. The inner peripheral surface of the inner ring portion 83c faces the outer peripheral surface of the shaft-side fitting portion 75. In this case, the rolling bearing 65 is provided between the outer peripheral surface of the shaft-side fitting portion 75 of the shaft part 61 and the inner peripheral surface of the inner ring portion 83c of the rotation support ring 83.

The plurality of blades 82 are connected to the outer peripheral surface of the rotation support ring 83. The plurality of blades 82 are provided to extend outward from the rotation support ring 83 in the radial direction, and are arranged at predetermined intervals in a circumferential direction. Each blade 82 is formed in the shape of an airfoil. Further, the radially inner end portion of each blade 82 is connected to the outer peripheral surface of the rotation support ring 83, and the radially outer end portion thereof is a free end.

The duct 63 is provided outside the shaft part 61 in the radial direction and serves as the supporting system (fixed side). The duct 63 is a duct that is formed in an annular shape and generates a thrust by the rotation of the rotation part 62. The upstream opening of the duct 63 in the axial direction of the rotational axis I serves as a suction port 38 and the downstream opening thereof serves as a blow-out port 39.

The motor 64 is an inner periphery drive motor that supplies power to the rotation part 62 from the shaft part 61 side to rotate the rotation part 62. The motor 64 includes a rotor-side magnet that is provided on the rotation part 62 side and a stator-side magnet that is provided on the shaft part 61 side. In the second embodiment, the rotor-side magnet is the permanent magnets 45 and the stator-side magnet is the coils (electromagnets) 46. Configuration related to the handling of wiring and the like around the coils 46 is simplified since the supporting system is provided with the coils 46 in the second embodiment. However, the present invention is not particularly limited to this configuration. The coils may be used as the rotor-side magnet and the permanent magnets 45 may be used as the stator-side magnet.

The permanent magnets 45 are provided to be held by the flange portion 83b of the rotation support ring 83, and are arranged in an annular shape in the circumferential direction. Since other configurations of the permanent magnets 45 are the same as those of the first embodiment, the description thereof will be omitted.

A plurality of coils 46 are provided to be held on the upstream end face of the shaft body 76 of the shaft part 61, are provided to face the respective poles of the permanent magnets 45, and are arranged in the circumferential direction. Since other configurations of the coils 46 are also the same as those of the first embodiment, the description thereof will be omitted.

Axial arrangement where the permanent magnets 45 and the coils 46 are arranged to face each other in the axial direction of the rotational axis I is made in the second embodiment, but a modification example shown in FIG. 12 may be made. Radial arrangement where the permanent magnets 45 and the coils 46 are arranged to face each other in the radial direction of the rotational axis I is made in the modification example shown in FIG. 12.

The permanent magnets 45 are provided to be held on the outer peripheral side of the inner ring portion 83c of the rotation support ring 83, and are arranged in an annular shape in the circumferential direction. The permanent magnets 45 are provided at positions facing the coils 46 in the radial direction of the rotational axis I.

A plurality of coils 46 are provided to be held in the shaft part 61, are provided to face the respective poles of the permanent magnets 45, and are arranged in the circumferential direction. The coils 46 are provided at positions facing the permanent magnets 45, which are held by the rotation part 62, in the radial direction of the rotational axis I. Radial arrangement where the permanent magnets 45 and the coils 46 are arranged to face each other in the radial direction of the rotational axis I as described above may be made.

Next, the cooling unit 67 will be described with reference to FIG. 13. In FIGS. 13 to 15, the present invention will be applied to a case where the permanent magnets 45 and the coils 46 of the motor 64 are in radial arrangement and will be described. The cooling unit 67 cools a heat generating part, which generates heat due to the operation of the motor 64, with cooling air. The heat generating part is, for example, the coils 46 of the motor 64. Since the coil 46 is simplified and shown in FIG. 13, the position of the coil 46 is different from the actual position thereof. Since the coils 46 are provided on the upstream end face of the shaft body 76 of the shaft part 61, the cooling unit 67 is provided at a portion, which leads to the hub 81 of the rotation part 62 from the shaft part 61, to cool the coils 46.'

The cooling unit 67 includes an air intake port 91 that takes cooling air in, an air discharge port 92 that discharges cooling air, and a cooling flow channel 93 that leads to the air discharge port 92 from the air intake port 91.

The air intake port 91 is formed on the outer peripheral surface of the shaft part 61. The air intake port 91 is provided on the downstream side (blow-out port 39 side) of the rotation part 62 in the axial direction of the rotational axis I.

The air discharge port 92 is formed on the outer peripheral surface of the hub 81 forming a part of the shaft part 61. The air discharge port 92 is provided on the upstream side of the rotation part 62 in the flow direction of air flowing toward the blow-out port 39 from the suction port 38. Pressure around a portion where the air discharge port 92 is formed is more negative than pressure around the air intake port 91.

The cooling flow channel 93 includes flow channels 93a that lead to the coils 46 from the air intake port 91, an internal space 93b of the shaft part 61 in which the coils 46 are arranged, and flow channels 93c that lead to the air discharge port 92 from the coils 46. The cooling flow channel 93 guides the air, which is taken in from the air intake port 91, to the internal space 93b as cooling air, introduces the cooling air into the internal space 93b, and guides the cooling air of the internal space 93b to the air discharge port 92.

The cooling unit 67 removes heat from the coils 46 by taking air in from the air intake port 91, blowing cooling air to the coils 46 in the internal space 93b, and discharging the cooling air, which has been blown to the coils 46, from the air discharge port 92.

The motor-integrated fan 60 supplies power, which is caused by the magnetic fields, to the rotation part 62 from the shaft part 61 side by the motor 64, so that the rotation part 62 is rotated. In a case where the rotation part 62 is rotated, the motor-integrated fan 60 sucks air from the suction port 38 and blows out air to the blow-out port 39. The air blown out of the rotation part 62 generates a thrust by flowing along the inner peripheral surface of the duct 63.

Further, since the flow speed of air flowing along the air discharge port 92 is increased in a case where the rotation part 62 is rotated, pressure around the air discharge port 92 is more negative than pressure around the air intake port 91. For this reason, the cooling unit 67 takes air in from the air intake port 91 and causes the taken-in air to flow in the cooling flow channel 93 as cooling air. The cooling air flowing in the cooling flow channel 93 is blown to the coils 46 in the internal space 93b. The cooling air blown to the coils 46 is discharged from the air discharge port 92. Accordingly, the cooling unit 67 removes heat from the coils 46 with the cooling air.

Next, other examples of the cooling unit 67 will be described with reference to FIGS. 14 and 15. Cooling flow channels 93 of a cooling unit 67 shown in FIG. 14 are formed in a linear shape toward an air discharge port 92 from an air intake port 91. Further, the cooling flow channels 93 formed in a linear shape are formed so as to cross the coils 46 in the internal space 93b. Furthermore, a plurality of cooling flow channels 93 are formed in the shaft part 61 and are formed to cross each other at the flow channels 93a. In this case, the plurality of cooling flow channels 93 may be adapted to communicate with each other or adapted to non-communicate (adapted not to communicate) with each other at the flow channels 93a crossing each other, and are not particularly limited.

For this reason, since the cooling flow channels 93 are formed in a linear shape in the cooling unit 67 shown in FIG. 14, cooling air smoothly flows. Accordingly, a pressure loss in the cooling flow channels 93 can be reduced.

A cooling unit 67 shown in FIG. 15 is adapted so that a cooling flow channel 93 is not formed in a linear shape as shown in FIG. 15. The cooling unit 67 shown in FIG. 15 is formed so that the cooling flow channel 93 is curved toward the air discharge port 92 from the air intake port 91. A ventilation guide 95 guiding cooling air taken in from the air intake port 91 is provided in the curved cooling flow channel 93. The ventilation guide guides cooling air toward the coils 46 from the air intake port 91 and guides cooling air toward the air discharge port 92 from the coils 46.

According to the second embodiment, as described above, in a case where the coils 46 are provided in the shaft part 61, cooling air can be taken in from the air intake port 91 using the negative pressure of the air discharge port 92 with respect to the air intake port 91 and cooling air having passed by the coils 46 serving as the heat generating part can be discharged from the air discharge port 92. For this reason, heat can be suitably removed from the coils 46 with cooling air. Further, since the negative pressure of the air discharge port 92 with respect to the air intake port 91 is used, the reduction of the fan performance of the motor-integrated fan 60 can be suppressed.

Furthermore, according to the second embodiment, since the cooling flow channels 93 are formed in a linear shape as shown in FIG. 14, a pressure loss in the cooling flow channels 93 can be suppressed. Accordingly, cooling air can be caused to more suitably flow in the cooling flow channels 93.

Moreover, according to the second embodiment, since the ventilation guide 95 is provided in the cooling flow channel 93 as shown in FIG. 15, cooling air can be appropriately guided to the coils 46 from the air intake port 91 and to the air discharge port 92 from the coils 46. For this reason, cooling air can be caused to more suitably flow in the cooling flow channel 93.

REFERENCE SIGNS LIST

1: motor-integrated fan (first embodiment)
11: shaft part
12: rotation part
13: duct
14: motor
15: rolling bearing
16: rectification plate
17: cooling unit
18: aerodynamic (flow acceleration) device
19: thermoelectric conversion element
20: control unit
31: hub
32: blade
33: rotation support ring
38: suction port
39: blow-out port
45: permanent magnet
46: coil
51: air intake port
52: air discharge port
53: cooling flow channel
55: heat transfer member
60: motor-integrated fan (second embodiment)
61: shaft part
62: rotation part
63: duct
64: motor
65: rolling bearing
66: rectification plate
67: cooling unit
68: aerodynamic (flow acceleration) device
69: thermoelectric conversion element
70: control unit
81: hub
82: blade
83: rotation support ring
91: air intake port
92: air discharge port
93: cooling flow channel
95: ventilation guide

The invention claimed is:

1. A motor-integrated fan that sucks air from a suction port and blows out the sucked air from a blow-out port, the motor-integrated fan comprising:
a shaft part at a center of a rotational axis;
a rotation part configured to rotate about the shaft part;
an outer peripheral part on an outer periphery of the shaft part;
a motor configured to rotate the rotation part, the motor including a heat generating part configured to generate heat due to an operation of the motor; and
a cooling unit configured to cool the heat generating part with cooling air,
wherein the cooling unit includes an air intake port to take the cooling air in, an air discharge port to discharge the cooling air, and a cooling flow channel leading to the air discharge port from the air intake port via the heat generating part,
wherein the air discharge port is provided at a position where pressure at the air discharge port is lower than pressure at the air intake port during operation,
wherein the heat generating part and the cooling unit are in the outer peripheral part,
wherein the air intake port is on an outer peripheral surface of the outer peripheral part, and
wherein the air discharge port is on the outer peripheral surface of the outer peripheral part and is closer to the suction port than the air intake port.

2. The motor-integrated fan according to claim 1, wherein the cooling flow channel is a flow channel extending to the air discharge port from the air intake port.

3. The motor-integrated fan according to claim 1, wherein an opening area of the air intake port is larger than an opening area of the air discharge port.

4. The motor-integrated fan according to claim 1, wherein the air intake port includes a plurality of holes.

5. The motor-integrated fan according to claim 1, wherein the air intake port includes a slit extending in a longitudinal direction.

6. The motor-integrated fan according to claim 1, wherein the air discharge port protrudes from an outer peripheral surface of the outer peripheral part.

7. The motor-integrated fan according to claim 1, further comprising:
   a flow acceleration device configured to cause the cooling air to flow during operation,
   wherein the flow acceleration device is provided in at least one of the air intake port, the air discharge port, and the cooling flow channel.

8. The motor-integrated fan according to claim 7, further comprising:
   a thermoelectric conversion element configured to convert thermal energy generated from the heat generating part into electric energy and to supply electric power to the flow acceleration device,
   wherein the thermoelectric conversion element includes a high-temperature part on the heat generating part side and a low-temperature part on a portion of which a temperature is lower than a temperature of the high-temperature part.

* * * * *